US012773717B2

(12) United States Patent
White et al.

(10) Patent No.: US 12,773,717 B2
(45) Date of Patent: Oct. 27, 2026

(54) PIERCING NOZZLE WITH RETENTION FEATURE

(71) Applicant: Albion Engineering Company, Moorestown, NJ (US)

(72) Inventors: Patrick M. White, Ocean View, DE (US); Jeffrey L. Serabo, Voorhees, NJ (US); Brian J. MacKenzie, Philadelphia, PA (US); Joseph B. Hanni, Cherry Hill, NJ (US)

(73) Assignee: Albion Engineering Company, Moorestown, NJ (US)

( * ) Notice: Subject to any disclaimer, the term of this patent is extended or adjusted under 35 U.S.C. 154(b) by 96 days.

(21) Appl. No.: 18/890,060

(22) Filed: Sep. 19, 2024

(65) Prior Publication Data

US 2026/0077381 A1 Mar. 19, 2026

(51) Int. Cl.
*B05C 17/005* (2006.01)

(52) U.S. Cl.
CPC .............................. *B05C 17/00586* (2013.01)

(58) Field of Classification Search
CPC ........ B05C 17/00583; B05C 17/00576; B05C 17/01; B05C 17/00506; B65D 83/7713; B65D 47/36; B65D 83/76; B65D 83/765
USPC .......... 222/81, 80, 82, 83.5, 88, 89, 90, 100, 222/103, 105, 326, 327, 95, 83, 389
See application file for complete search history.

(56) References Cited

U.S. PATENT DOCUMENTS 5,301,835 A * 4/1994 Fulks ................ B05C 17/00576 222/105
5,697,524 A 12/1997 Sedlmeier
5,897,028 A 4/1999 Sauer
6,564,970 B1 5/2003 Walch et al.
7,690,530 B2 * 4/2010 Schneider ......... B05C 17/00583 222/105
8,016,808 B2 9/2011 Keller
9,862,533 B2 1/2018 Stever et al.
10,596,591 B2 3/2020 Lee, III
10,766,053 B2 9/2020 Lee, III
11,850,624 B2 12/2023 Schöck et al.
2005/0258189 A1 11/2005 Peterson et al.
2021/0299695 A1 9/2021 Kham-Orn
2023/0159260 A1 5/2023 Lee
2023/0256466 A1 8/2023 Lee
2023/0312220 A1 10/2023 Lee
2024/0351772 A1 * 10/2024 Lee ................... B05C 17/00576

* cited by examiner

*Primary Examiner* — Christopher R Demeree
(74) *Attorney, Agent, or Firm* — Saxton & Stump, LLC

(57) ABSTRACT

The invention relates to a nozzle having a piercing projection for safe and efficient release of viscous material from a collapsible tube sealed at a front end and a rear end by tie clips when housed within a dispensing tool. The piercing projection extends from the nozzle interior surface. The piercing projection is arranged to pierce the front end of the collapsible tube along a tear line to form a flap of the collapsible tube to which the front end tie clip remains attached. An upstanding wall extends from the nozzle interior surface to define a retention shelf between the upstanding wall and the nozzle interior surface. The retention shelf is configured to receive and retain therein the flap and the front end tie clip during dispensing to enable unobstructed flow of the viscous material through the dispensing end opening.

20 Claims, 17 Drawing Sheets

PIERCING NOZZLE WITH RETENTION FEATURE

BACKGROUND OF THE INVENTION

This invention relates generally to dispensing devices, and more specifically to dispensing devices for viscous materials.

Dispensing devices for the application of various viscous material products such as caulking materials, dual component reactive resins, adhesives, sealants, and the like, are well known throughout many industries. Such dispensing devices ideally allow the viscous material to be applied in an accurate, mess-free, and waste-free manner.

Dispensing devices are often in the form of a dispensing gun, or caulking gun. Dispensing devices generally include a squeezable handle and trigger assembly which is operative for advancing the pistons of the dispensers and for maintaining the pistons in advanced positions when the trigger portions of the dispenser devices are released. The viscous materials can be packaged in a variety of forms; some of the most common are cartridge form, collapsible tubes, and bulk form.

Collapsible tubes are a popular form of container for viscous materials. Collapsible tubes have been known in the trade for many years and offer the benefits of providing good shelf stability for the contained chemicals, low package cost, and minimal packaging waste. Collapsible tubes are generally known in the art as a "sausage" or "chub." Collapsible tubes have a collapsible wall often formed of a thin film material, that is sealed at each end using a tie clip usually formed of metal or plastic. While collapsible tubes can be used to contain non-reactive viscous material products, the collapsible tube is typically moisture impervious, thus allowing the collapsible tube to contain reactive viscous material products also (typically reactive viscous material products are ones that react when exposed to humidity in the air). All of these options (i.e., cartridge, bulk form, and collapsible form) can be employed in dual component dispensing devices as well as in single component dispensing devices.

Before dispensing from a collapsible tube, the user must remove the metal tie clip from its dispensing end. To do this, the user first pulls back a piston rod of the dispensing device and loads the collapsible tube most of the way into the barrel leaving a small portion exposed. Next, the user locates the metal tie clip at the exposed end for removal. Often, a small portion of the viscous material may cure just beneath the metal tie clip, which also must be removed. Using a razor, a pocket-knife, or a utility blade, the user snips the thin film material of the collapsible tube just below the metal tie clip to remove the metal tie clip and any cured viscous material to open the collapsible tube for dispensing. The user then loads the remaining portion of the collapsible tube into the barrel and replaces the front cap (with the nozzle extending therethrough) onto the barrel dispensing end and the dispensing device ready for dispensing. A problem exist with this approach because use of such sharp tools can often result in worker injuries, which is an issue for both workers and employers.

To address this problem, dispensing nozzles have been introduced that include one or more piercing features located on the interior surface of the nozzle body, thus eliminating the need for such sharp tools and reducing the potential for worker injury. The piercing features include piercing tips that protrude in a rearward direction through the inlet end of the nozzle to face the collapsible tube when loaded within the barrel. The collapsible tube is loaded into the barrel and the front cap (with the nozzle extending therethrough) is replaced on the barrel dispensing end. Upon squeezing the dispensing device trigger, force is applied against the collapsible tube pushing it in a forward direction and against the piercing tips of the nozzle which pierce the thin film material of the collapsible tube enabling viscous material to dispense through the nozzle. However, a difficulty arises because often the thin film material of the collapsible tube and/or the metal clip become lodged in the nozzle restricting flow of the viscous material during dispensing, which may only be a moderate problem if the viscosity of the fluids is very low but can be a great problem if the product viscosity is high and the product is pasty. Another difficulty is that if the outlet end of the nozzle is sufficiently large, the metal tie clip may pass through the nozzle and into the end product. Accordingly, there is a need for an improved nozzle having a piercing member that addresses these deficiencies.

SUMMARY OF THE INVENTION

The invention relates to a nozzle having one or more piercing projections for safe and efficient release of viscous material from a collapsible tube sealed at a front end and a rear end by tie clips when housed within a dispensing device. The one or more piercing projections extend from the nozzle interior surface. The one or more piercing projections are arranged to pierce the front end of the collapsible tube along a tear line to form a flap of the collapsible tube to which the front end tie clip remains attached. An upstanding wall extends from the nozzle interior surface to define a retention shelf between the upstanding wall and the nozzle interior surface. The retention shelf is configured to receive and retain therein the flap and the front end tie clip to enable unobstructed flow of the viscous material through the dispensing end opening.

BRIEF DESCRIPTION OF THE DRAWINGS

The present invention will hereinafter be described in conjunction with the appended drawing figures wherein like numerals denote like elements.

DETAILED DESCRIPTION OF THE PREFERRED EMBODIMENTS

Figure 1:
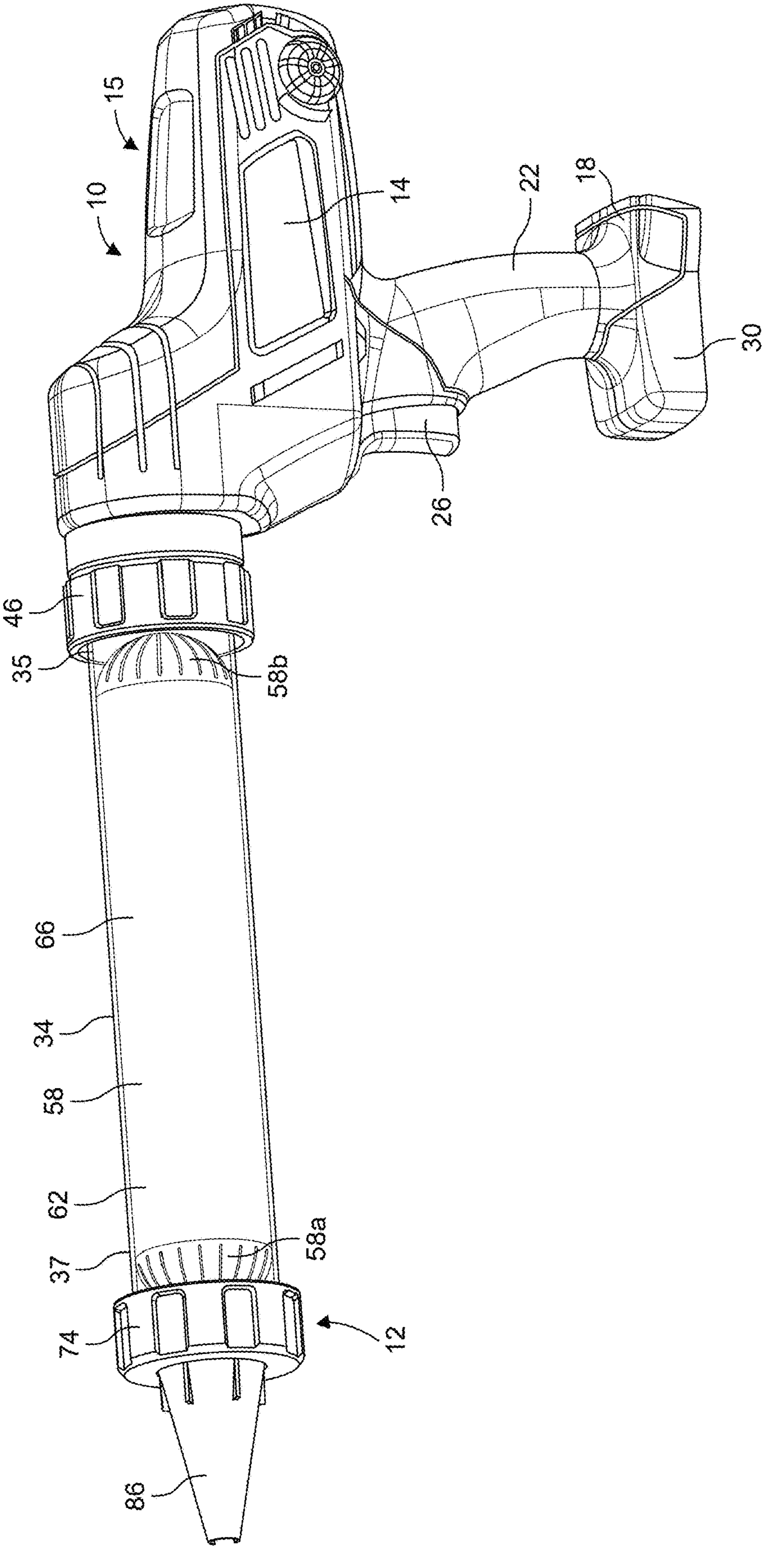
FIG. 1 is a perspective view of a piercing nozzle according to an exemplary embodiment of the present invention installed on an exemplary device for dispensing a viscous material from a collapsible tube.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims.

To aid in describing the invention, directional terms are used in the specification and claims to describe portions of the present invention (e.g., upper, lower, left, right, etc.). These directional definitions are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

Figure 2:
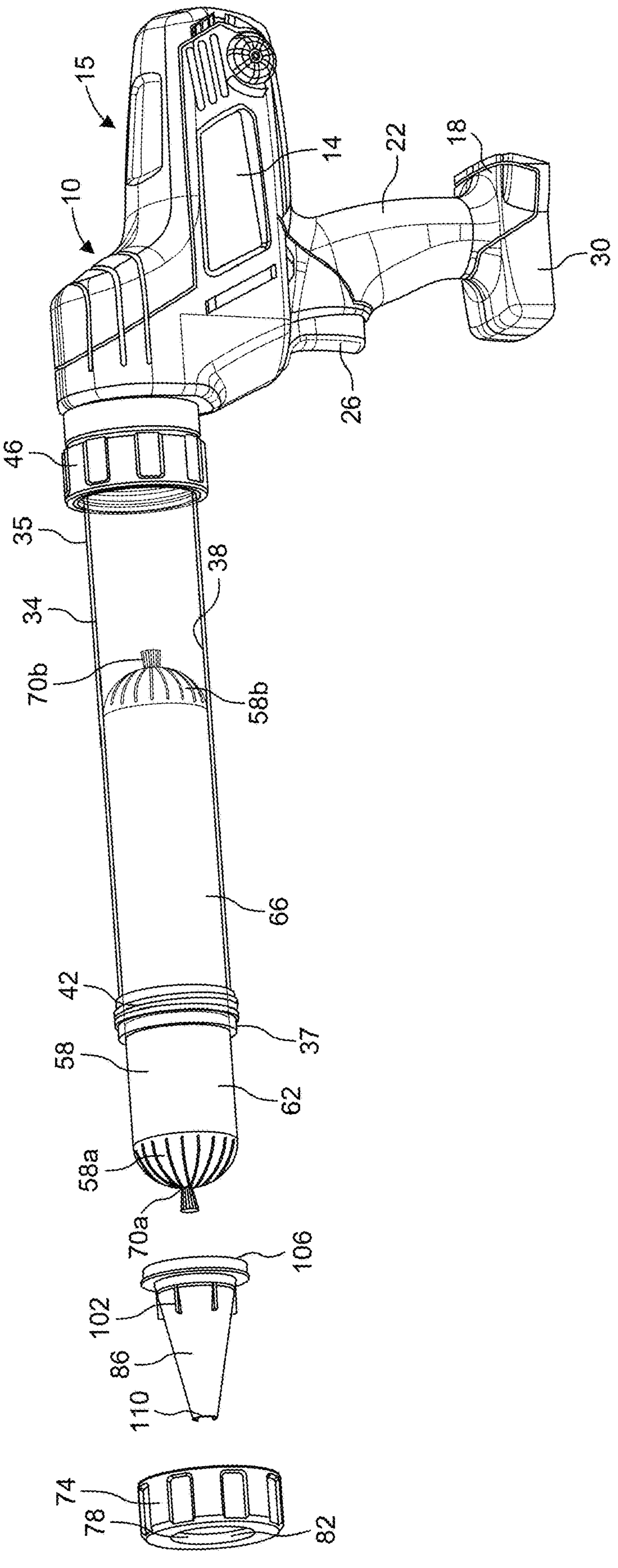
FIG. 2 is an exploded view of the piercing nozzle, the dispensing device, and the collapsible tube of FIG. 1.
Figure 7:
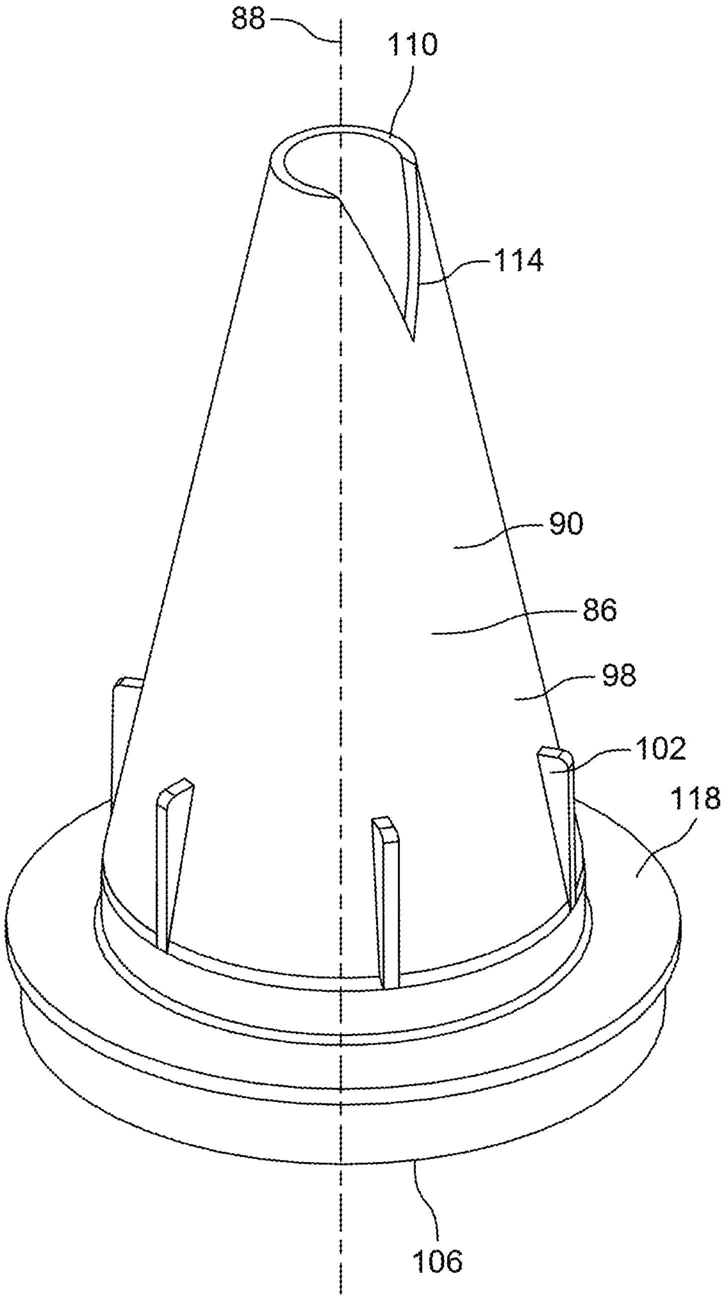
FIG. 7 is a perspective view of the piercing nozzle.

Referring now to FIGS. 1-2, there is shown a dispensing device 10 according to an exemplary embodiment of the present invention. The dispensing device 10 comprises a main body 14 to which a rear end cap 46 is attached. A barrel 34 extends forwardly from the main body 14 in axial alignment with the main body 14 and includes a fixed end 35 arranged for engagement, e.g., threaded engagement, with the rear end cap 46 and a dispensing end 37. At the dispensing end 37, the barrel is provided with external threads 42 that are engageable with internal threads on a front-end cap 74. The front-end cap 74 includes a central aperture adapted to receive a piercing nozzle 86 therethrough. As best illustrated in FIG. 7, the piercing nozzle 86 is provided with an annular shoulder 118 having a width or diameter substantially the same as the outer diameter of the barrel 34 such that when the internal threads of the front end cap 74 engage with the external threads 42 of the barrel 34, the nozzle 78 may be tightly retained between the front end cap 74 and the barrel dispensing end 37. The piercing nozzle 86 can be removably attachable to or integrally formed with the barrel dispensing end 37. It can be appreciated that other securing mechanisms can be utilized instead of threads such as, but not limited to, clips, latches, locks or magnets.

As best shown in FIGS. 1 and 2, a collapsible tube 58 containing a supply of viscous material such as caulking or sealant materials is shown disposed within the barrel 34. It can be appreciated that the collapsible tube 58 can include any cylindrically shaped or sausage-shaped casing 62 that is collapsible and contains an extrudable material therein. In the exemplary embodiment, the extrudable material can be, but not limited to, a sealant, grease, a lubricant, food materials, a caulking material, a paste, mixable compounds, a filler and the like. As best shown in FIG. 2, the collapsible tube 58 includes a front end 58*a* wherein the casing 62 is gathered, tied off, and sealed using a front closure clip 70*a*, and a rear end 58*b* wherein the casing 62 is gathered, tied off, and sealed using a rear closure clip 70*b*.

A hand grip 22 extends integrally and angularly from the main body 14 to present a pistol-like appearance. The main body 14 may include a battery receptacle 18 positioned at a base of the dispensing device 10 and may be configured to receive a battery 30 (e.g., a power tool battery pack). The battery receptacle 18 may include an attachment mechanism (e.g., actuating latches-not shown) to removably couple the battery 30 to the battery receptacle 18. In some embodiments, the battery 30 may be an 18 V battery. Mounted within the main body 14 is an electric motor (not shown) which is energized by squeezing a trigger 26 which is moveable with respect to the hand grip 22. In some embodiments, the hand grip 22 may be at least partially formed from an elastomeric material (e.g., rubber) to assist the user in maintaining a firm grasp on the hand grip 22. In some embodiments, the hand grip 22 may be provided with a trigger lock (not shown) which is moveable between an unlocked position and a locked position in which the trigger lock prevents actuation of the trigger 26.

Upon being energized, the motor drives a compression assembly 15 housed within the main body 14 and extending into the barrel 34 to compress the collapsible tube 58 to dispense the viscous material 66 from the collapsible tube 58 and through the piercing nozzle 86. It can be appreciated that the compression assembly may include a plunger mechanism (not shown) driven by the motor through a gear system. As the plunger assembly moves distally within the barrel 34, it compresses the collapsible tube 58 to expel the viscous material 66 contained therein.

The piercing nozzle 86 can be configured to assist in dispensing and/or spreading material dispensed from the collapsible tube 58 onto a surface or into a gap. The nozzle 86 can be made of, but not limited to, plastic, metal, composite, an alloy or any combination thereof. With reference to FIGS. 3-9, an exemplary embodiment of the piercing nozzle 86 is illustrated and will be described. The piercing nozzle 86 can include a body featuring a nozzle sidewall 90 defining a nozzle cavity 96, an interior surface 94, an external surface 98, a receiving end opening 106 configured to receive viscous material 66 from the front end 58*a* of the collapsible tube 58, a dispensing end opening 110, and a central longitudinal axis 88. The nozzle 86 may include a tapered profile in which the receiving end opening 106 is wider than the dispensing end opening 110. A width or diameter of the receiving end opening 106 can be substantially the same as the width or diameter of the collapsible tube 58 so that they contact each other during use and allow the collapsible tube front end 58*a* to easily travel into the nozzle cavity 96.

Figure 3:
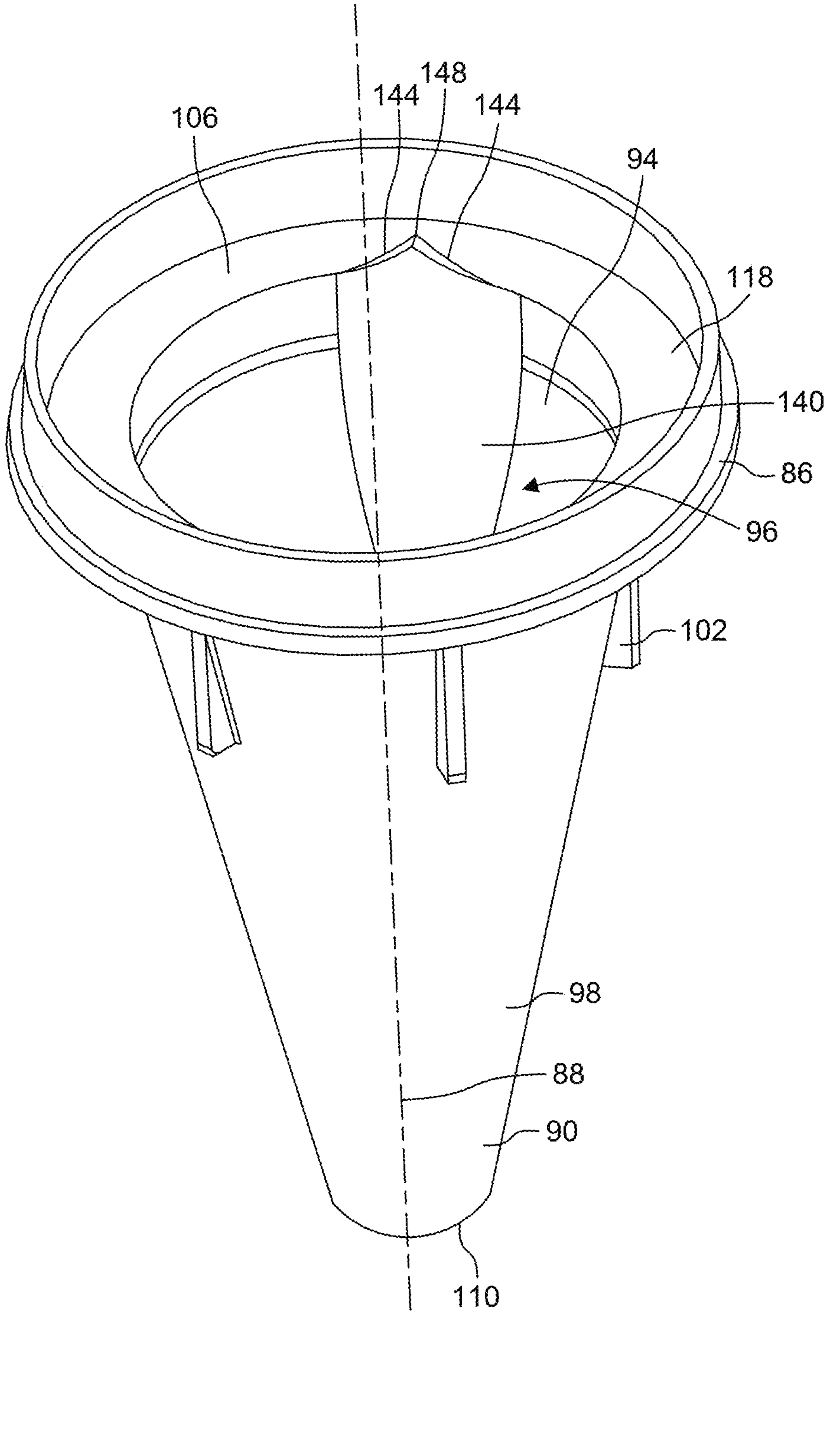
FIG. 3 is an enlarged perspective view of the piercing nozzle illustrating a piercing projection.
Figure 5:
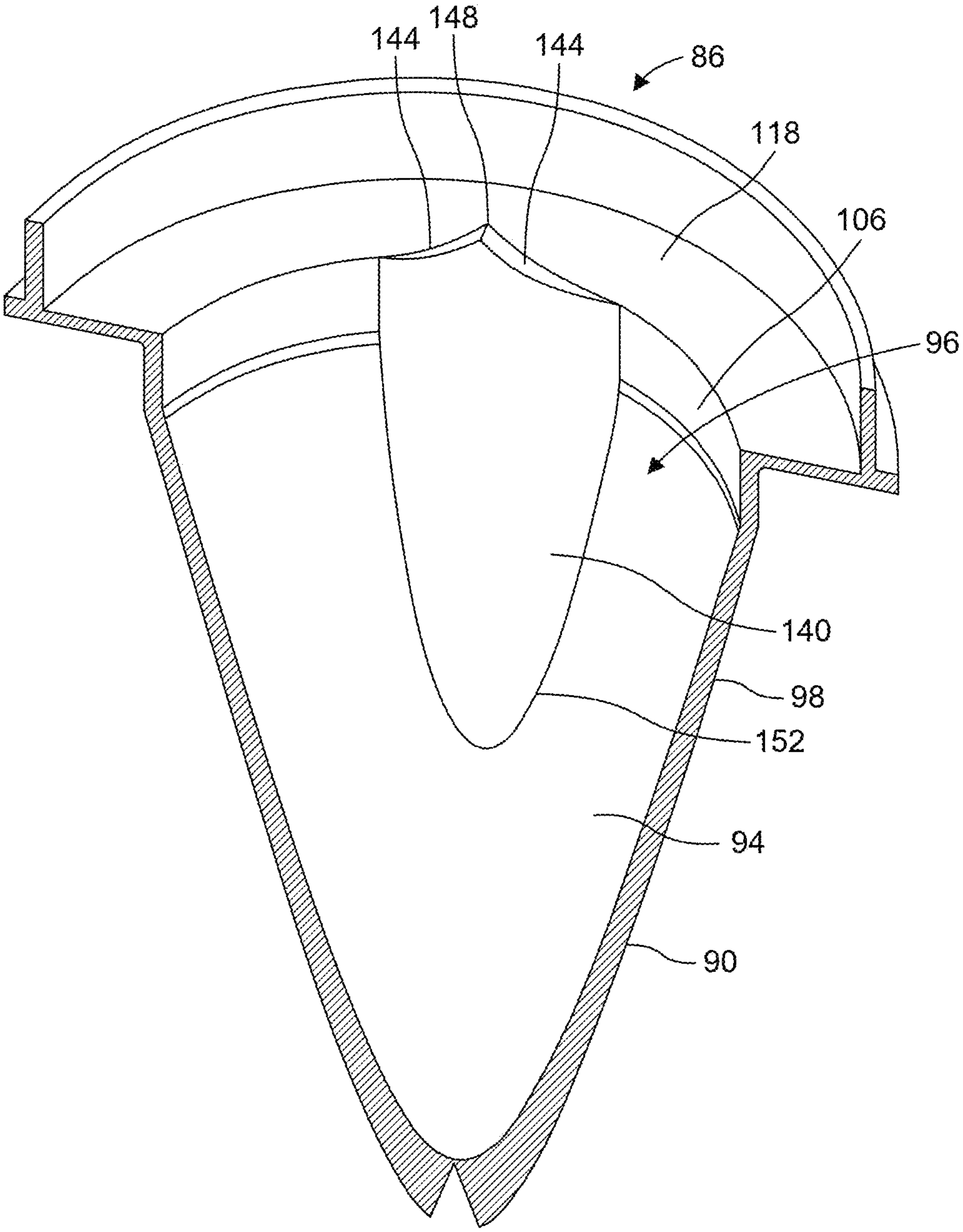
FIG. 5 is an enlarged sectional view of the piercing nozzle illustrating the piercing projection.
Figure 6:
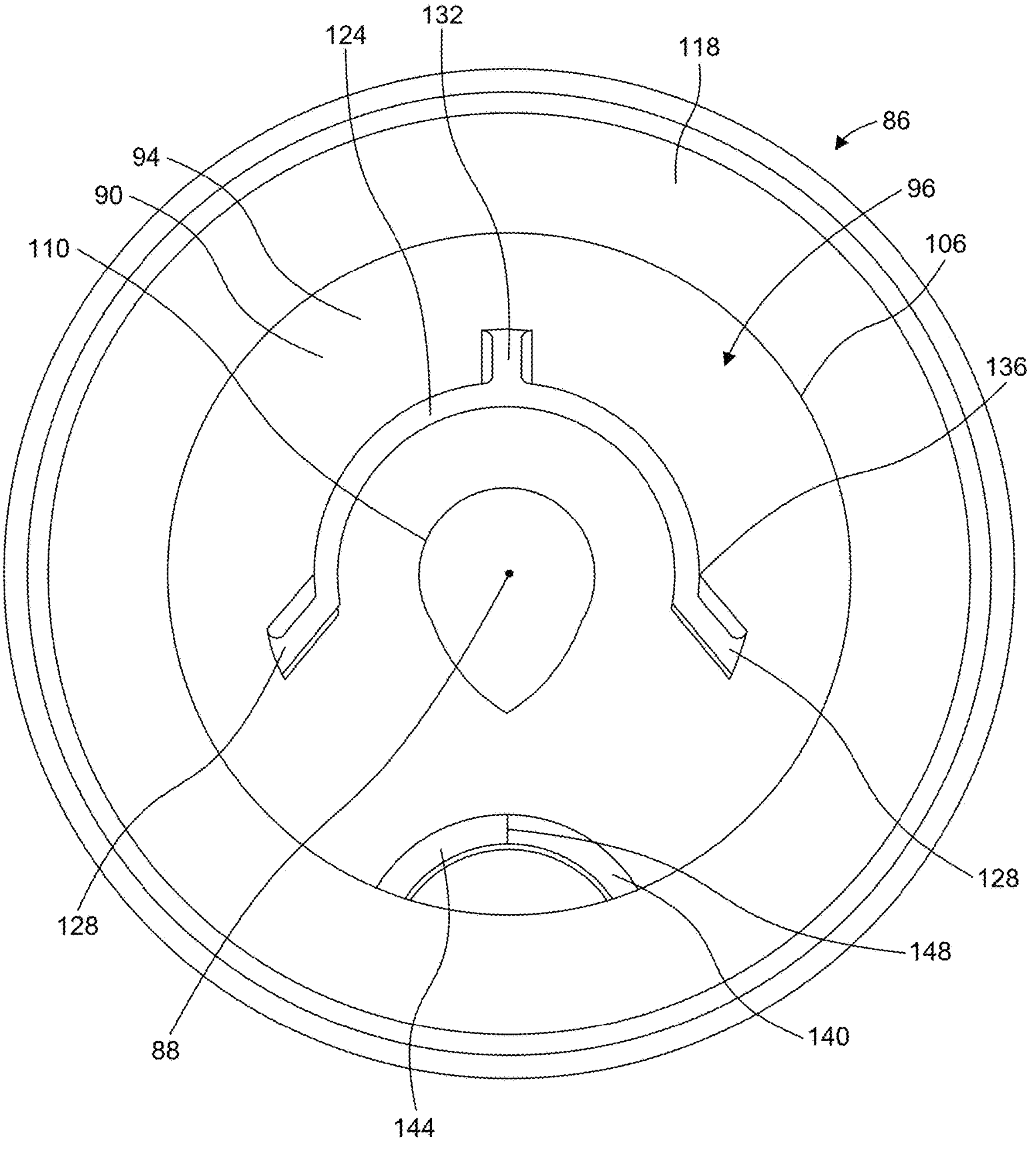
FIG. 6 is an enlarged bottom view of the piercing nozzle illustrating the piercing projection and the upstanding wall forming the retention shelf.

As best illustrated in FIGS. 3, 5, and 6, a piercing projection 140 extends from the interior surface 94 of the nozzle 86. In the exemplary embodiment, one piercing projection 140 is shown. In alternative embodiments, more than one piercing projection 140 may extend from the nozzle interior surface 94. As best illustrated in FIG. 6, the piercing projection 140 includes an arcuate body that extends inwardly from the nozzle interior surface 94 into the nozzle cavity 96. As best illustrated in FIG. 5, the piercing projection 140 is situated on the nozzle interior surface 94 at a location that is upstream and proximate to the receiving end opening 106 of the nozzle 86. The piercing projection 140 includes a peripheral edge 152 that is contoured for securement to the nozzle interior surface 94. Alternatively, the piercing projection 140 may be integrally formed with the nozzle interior surface 94.

Figure 8:
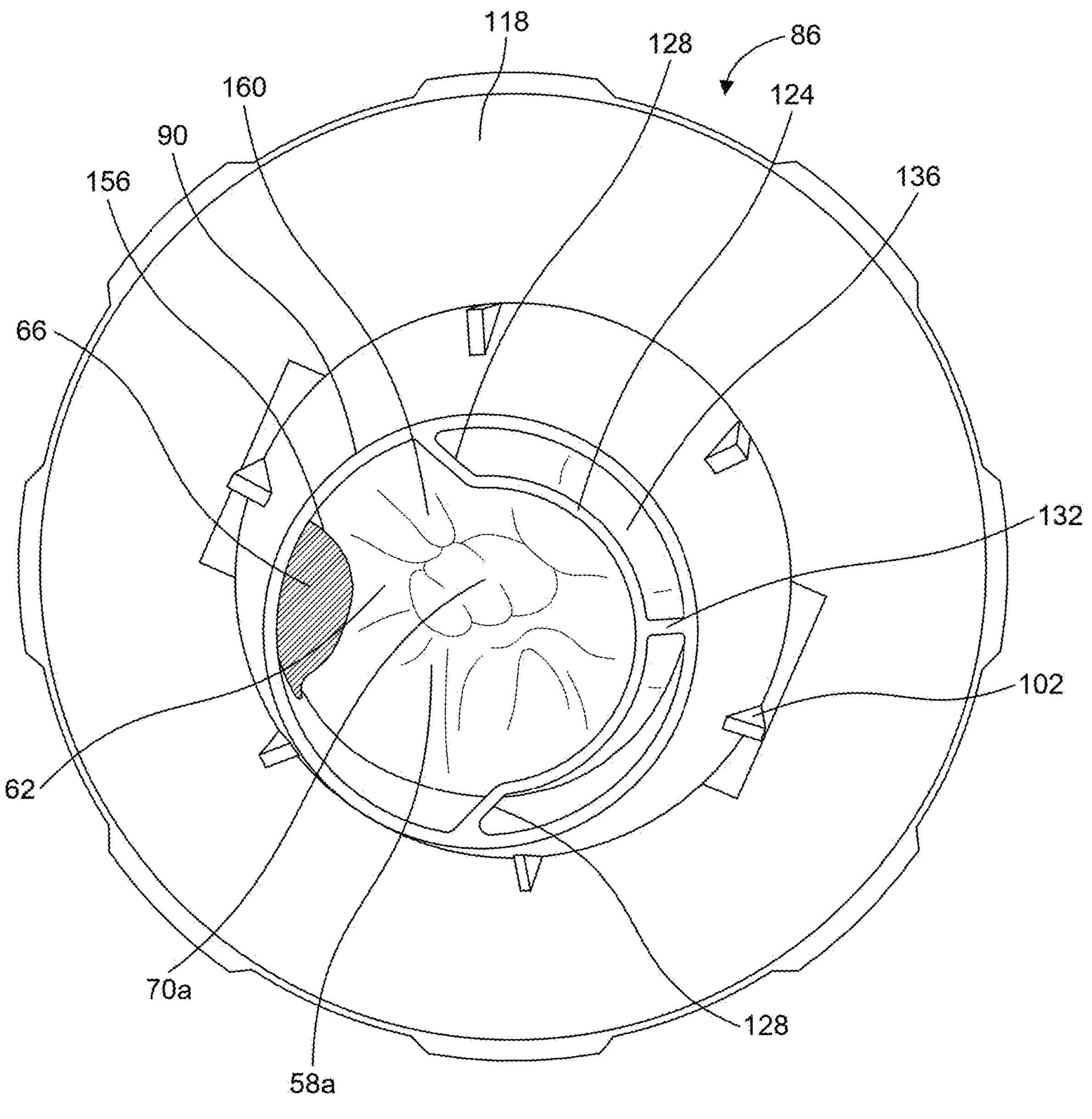
FIG. 8 is an enlarged sectional view of the piercing nozzle illustrating operation of the piercing projection and retention shelf during dispensing of viscous material from the collapsible tube.

The piercing projection 140 includes a pair of inclined surfaces 144 that slope upwardly and converge at a piercing tip 148 that points backwards or upstream towards the collapsible tube 58 when disposed within the barrel 34. In alternative embodiments, the piercing tip 148 may extend through the receiving end opening 106 in the upstream direction. Also, in alternative embodiments, the inclined surfaces 144 could be curved or planar. The piercing tip 148 may be configured to easily pierce or puncture the casing 62 of the collapsible tube 58 when the collapsible tube 58 is pressed against the piercing tip 148 by the compression assembly. Referring now to FIG. 6, in the exemplary embodiment, the piercing projection 140 is offset from a central longitudinal axis 88 of the nozzle 86 so as to not obstruct the dispensing end opening 110, thereby maintaining a clear path for viscous material to pass or travel through during dispensing. Referring now to FIG. 8, once pierced, the casing 62 of the collapsible tube 58 will tear along a tear line 156 to form a flap 160 of the casing 62 to which the front closure clip 70*a* will remain attached.

Figure 4:
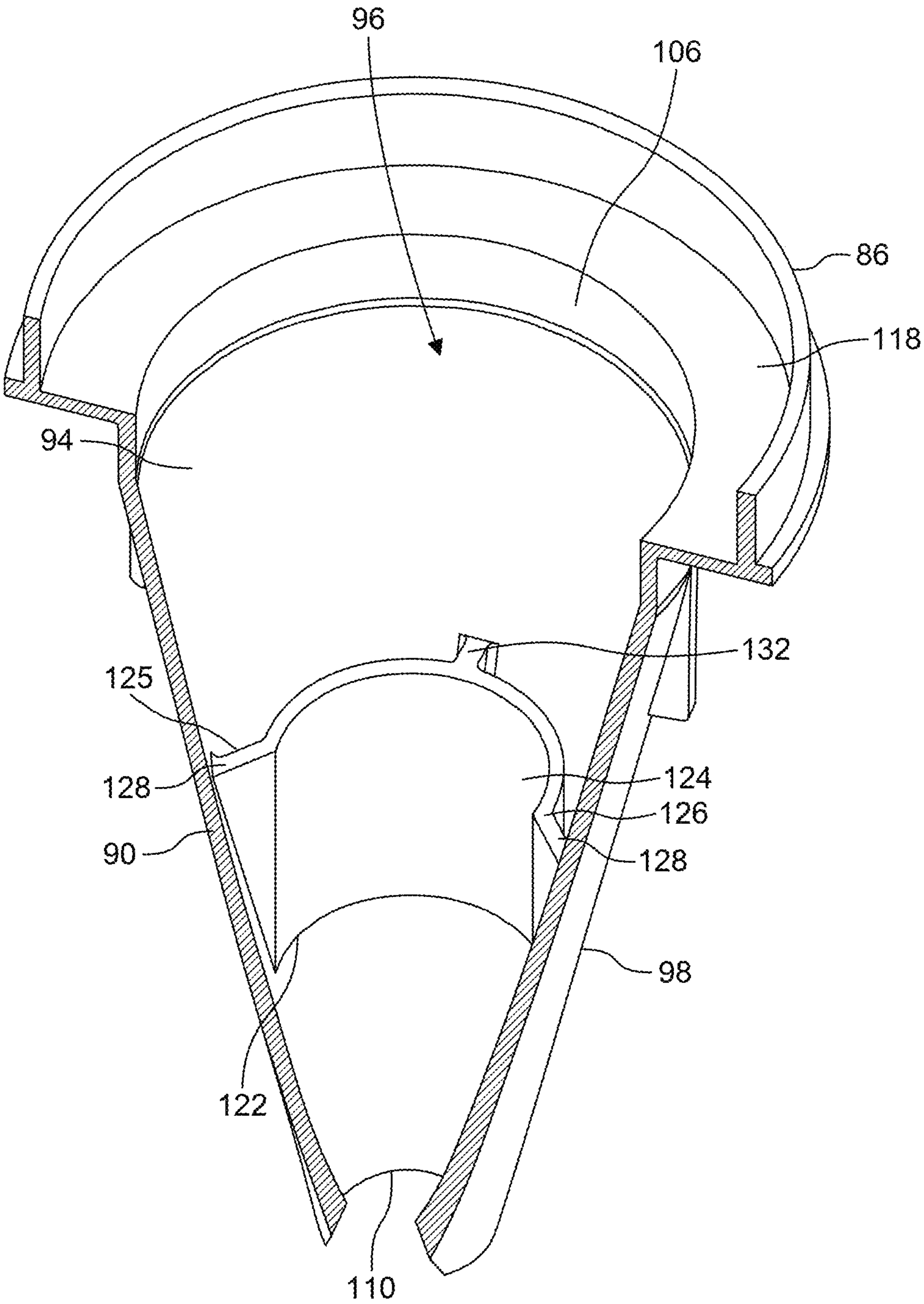
FIG. 4 is an enlarged sectional view of the piercing nozzle illustrating an upstanding wall forming a retention shelf.

As best illustrated in FIGS. 4, 6, 8, and 9, an upstanding wall 124 is shown extending within the nozzle interior surface 94. In the exemplary embodiment, the upstanding wall 124 forms a portion of a cylinder. The upstanding wall 124 includes a base edge 122 shaped to secure the upstanding wall 124 to the nozzle interior surface 94. Alternatively, the upstanding wall 124 may be integrally formed with the nozzle interior surface 94. From the base edge 122, the upstanding wall 124 extends towards the receiving end opening 106. As best illustrated in FIG. 4, the upstanding wall 124 is situated on the nozzle interior surface 94 at a location that is downstream and proximate to the dispensing end opening 110 of the nozzle 86. Thus, the piercing projection 140 is situated on the nozzle interior surface 94 at a relatively upstream position, while the upstanding wall 124 is situated on the nozzle interior surface 94 at a relatively downstream position. In addition, as best shown in FIG. 6, in some embodiments, the piercing projection 140 and the upstanding wall 124 may be located at opposed sides on the nozzle interior surface 94.

As best illustrated in FIG. 4, the upstanding wall 124 includes a first end 125 and a second end 126. In the exemplary embodiment, a plurality of support ribs 128 are provided that extend from the first end 125 and the second end 126 to the interior surface 94 of the piercing nozzle 86 to provide the upstanding wall 124 with a degree of rigidity. Support ribs may also be positioned at locations along the length of the upstanding wall 124 to provide additional rigidity to the upstanding wall 124. For example, an additional support rib 132 may be located approximately midway along the length of the upstanding wall 124 between the first end 125 and the second end 126. The support added by the ribs 128 and 132 enable the upstanding wall 124 to remain rigid as the viscous material 66 flows through the nozzle 86. As best shown in FIG. 6, due to its partial cylindrical configuration, the upstanding wall 124 is offset from the dispensing end opening 110 so as to not obstruct it, thereby maintaining a clear path for the viscous material 66 to pass or travel through during dispensing.

Figure 9:
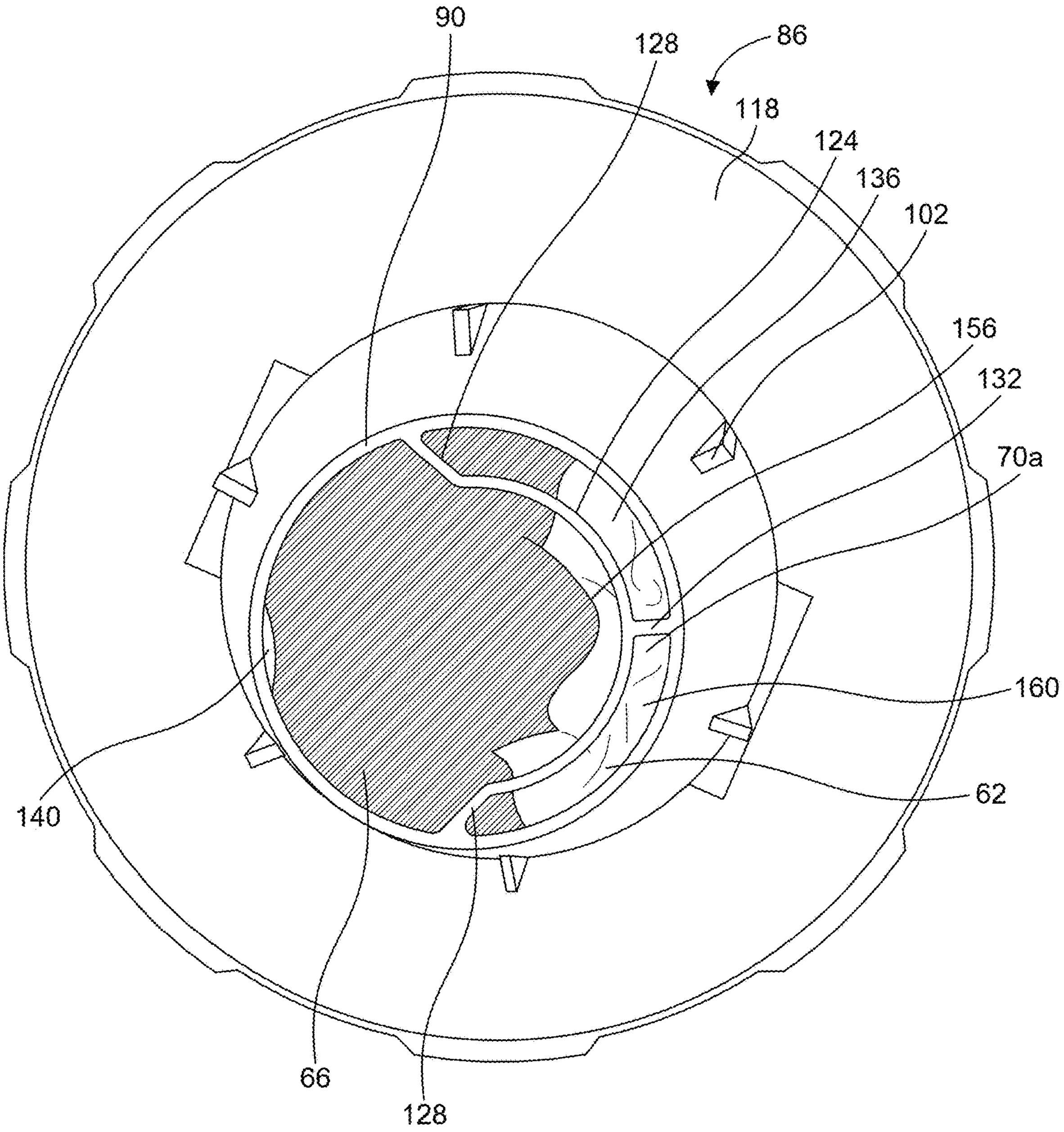
FIG. 9 is an enlarged sectional view of the piercing nozzle illustrating operation of the piercing projection and retention shelf during dispensing of the viscous material from the collapsible tube.
Figure 10:
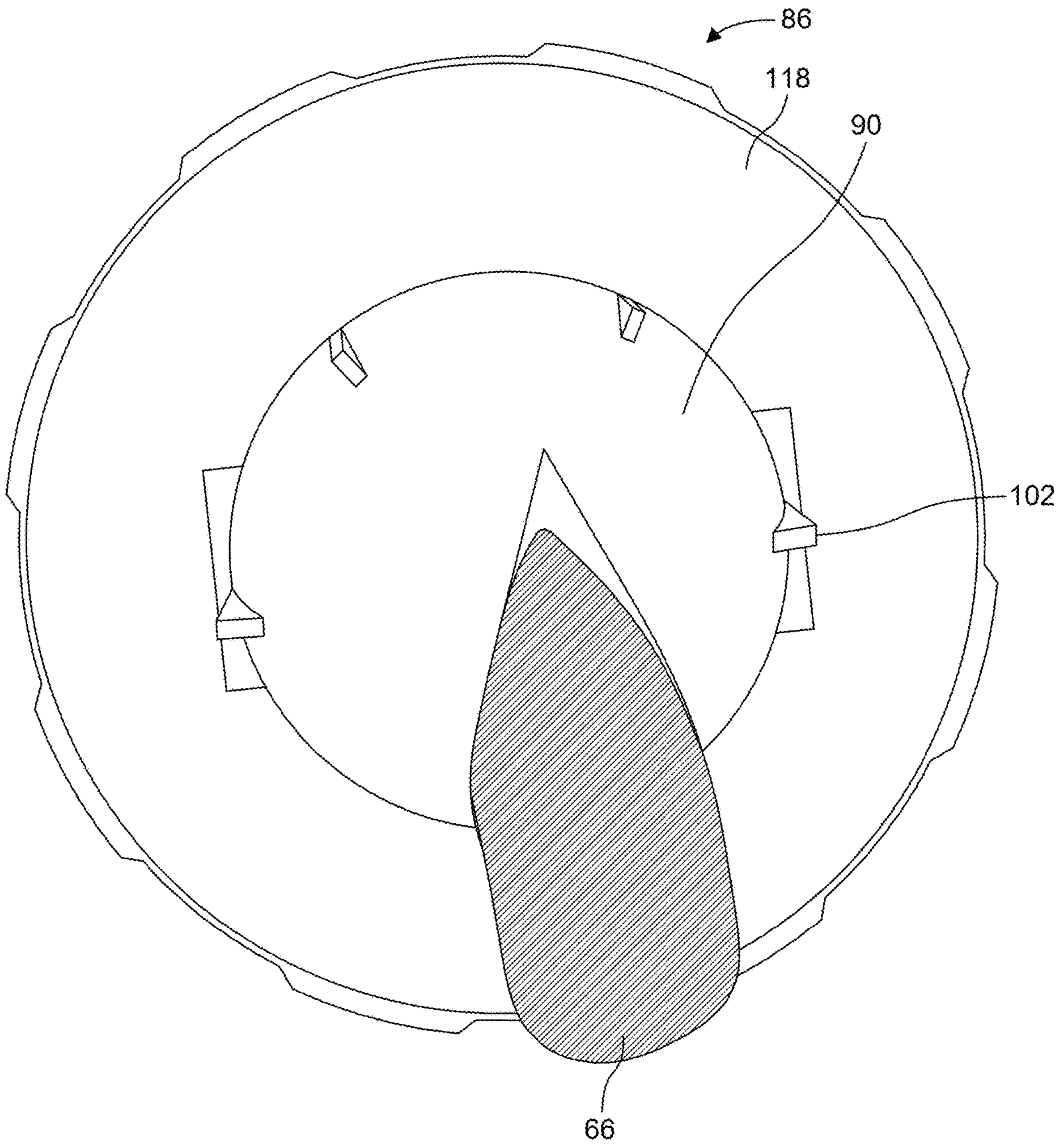
FIG. 10 is an enlarged top view of the piercing nozzle during dispensing of viscous material from the collapsible tube.

As best shown in FIGS. 6, 8, and 9, as the upstanding wall 124 extends from the base edge 122, a retention shelf 136 is formed between the nozzle interior surface 94 and the upstanding wall 124. The retention shelf 136 extends the length of the upstanding wall 124 between the first end 125 and the second end 126. Referring now to FIGS. 8 and 9, as the collapsible tube 58 is pressed against the piercing tip 148, the casing 62 in proximity to the front end 58*a* is pierced to expel the viscous material 66 therefrom. In FIG. 8, an initial amount of viscous material 66 is shown being expelled from the collapsible tube 58. As the collapsible tube 58 continues to be compressed, the piercing tip 148 continues to tear through the casing 62 along the tear line 156 to form a flap 160. The front closure clip 70*a* remains attached to the flap 160. In FIG. 9, as more viscous material 66 is expelled from the collapsible tube 58 and travels downstream through the nozzle 86, the viscous material 66 pushes the flap 160 and front closure clip 70*a* downwardly through the nozzle 86 and into the retention shelf 136 and out of the way, thereby providing clear passage for easy flow of the viscous material 66 through the dispensing end opening 110 of the nozzle 86. In this manner, the retention shelf 136 prevents the problem of the flap 160 and/or front closure clip 70*a* becoming lodged in the dispensing end opening 110 to prevent or limit the flow of viscous material therethrough. In some embodiments, once dispensing is complete, the front end cap 74 may be removed from the first barrel end 35, and the nozzle and collapsed tube 58 may be removed from the front cap 74 and discarded. It has been found that for most products such as caulk, dual component reactive resins, adhesives, and sealants, it is optimal to employ a single piercing projection 140 situated on the nozzle interior surface 94 at a location that is relatively upstream and opposite the location of the retention shelf 136. However, it can be appreciated that for some products, especially those formed of a softer material or having a lower viscosity, it may be preferable to employ two or more piercing projections 140 positioned on the nozzle interior surface 94 at locations upstream and opposite the location of the retention shelf 136.

It should be understood that although the inventive nozzle 86 is described as utilized in combination with a battery-operated dispensing device, this type of dispensing device is merely exemplary, and in other embodiments, the inventive nozzle 86 may be used with other types of conventional powered dispensing devices such as electrically powered and pneumatically powered dispensing devices or may be utilized in combination with conventional manual mechanical style dispensing devices (not shown).

Figure 14:
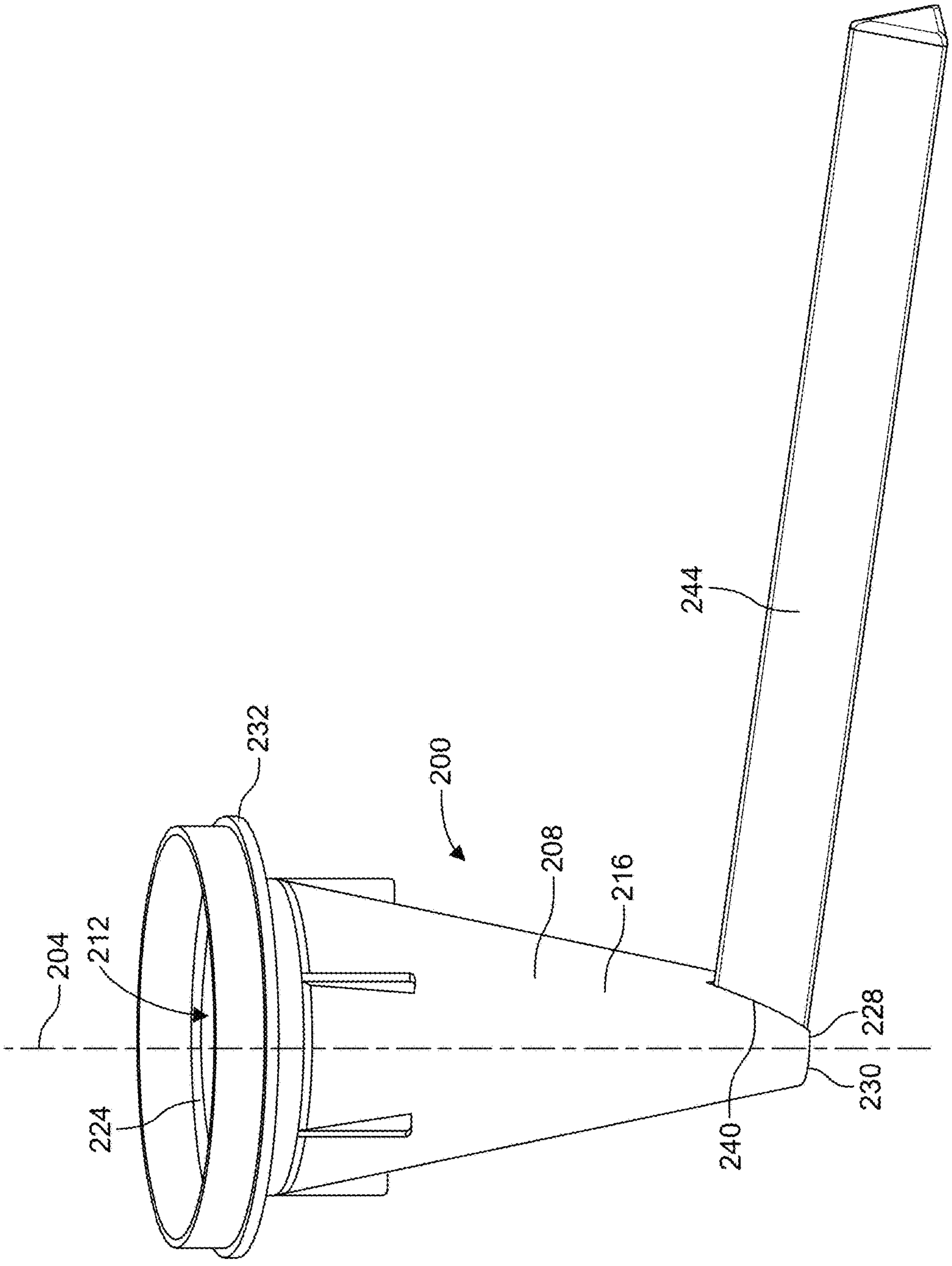
FIG. 14 (PRIOR ART)

Referring now to FIG. 14, there is shown a prior art or conventional dispensing nozzle 200 for dispensing a viscous material such as an adhesive during installation of automobile glass, such as windshields. The nozzle 200 includes a sidewall 208 defining a cavity 212, an external surface 216, a receiving end opening 224, a dispensing end opening 228, and a central longitudinal axis 204. The dispensing nozzle 200 is shaped as a cone with the receiving end opening 224 wider than the dispensing end opening 228. The dispensing nozzle 200 may be provided with an annular shoulder 232 to enable its retention to a dispensing device, as described above.

The dispensing end opening 228 includes a generally circular aperture 230 located at the tip of the nozzle 200. The generally circular aperture 230 is oriented perpendicular to the central longitudinal axis 204. The dispensing end opening 228 also includes an inverted V-shaped notch 240 formed in the sidewall 208 and extending upwardly from the generally circular aperture 230. The inverted V-shaped notch 240 is in fluid communication with the generally circular aperture 230. This nozzle tip arrangement including the generally circular aperture and V-shaped notch could optionally be employed as part of the inventive nozzle 86 attached at the barrel dispensing end 37 as best illustrated in FIGS. 2 and 7.

In many applications, such as the installation of a windshield during automobile assembly, it is critical that a dispensed V-bead 244 of adhesive be consistent in cross-sectional shape along its length to ensure an effective seal and bond of the windshield glass to the automobile at all points. To accomplish this, the installer must position the dispensing device 200 at 90 degrees to the work surface (perpendicular), as shown in FIG. 14, and bring the circular aperture 230 of the nozzle 200 into contact with the work surface such that the viscous material is dispensed onto the work surface solely through the inverted V-shaped notch 240 to form the V-bead, and is blocked from being dispensed through the circular aperture 230 which can corrupt the uniform cross-sectional shape of the V-bead. However, in many workplaces, such as during the installation of auto glass, maintaining the nozzle 200 in this upright orientation on the work surface can be difficult, as access to the work surface can be difficult. When handling automobile windshields weighing 50-60 pounds, an installer must be able to maneuver the glass at various different angles and orientations, requiring constant repositioning of the nozzle 200 as the position of the installer changes. If the installer is unable to maintain the dispensing device 200 in this upright orientation and in contact with the work surface during dispensing, the resulting adhesive bead 244 will be uneven and unsatisfactory.

Figure 11:
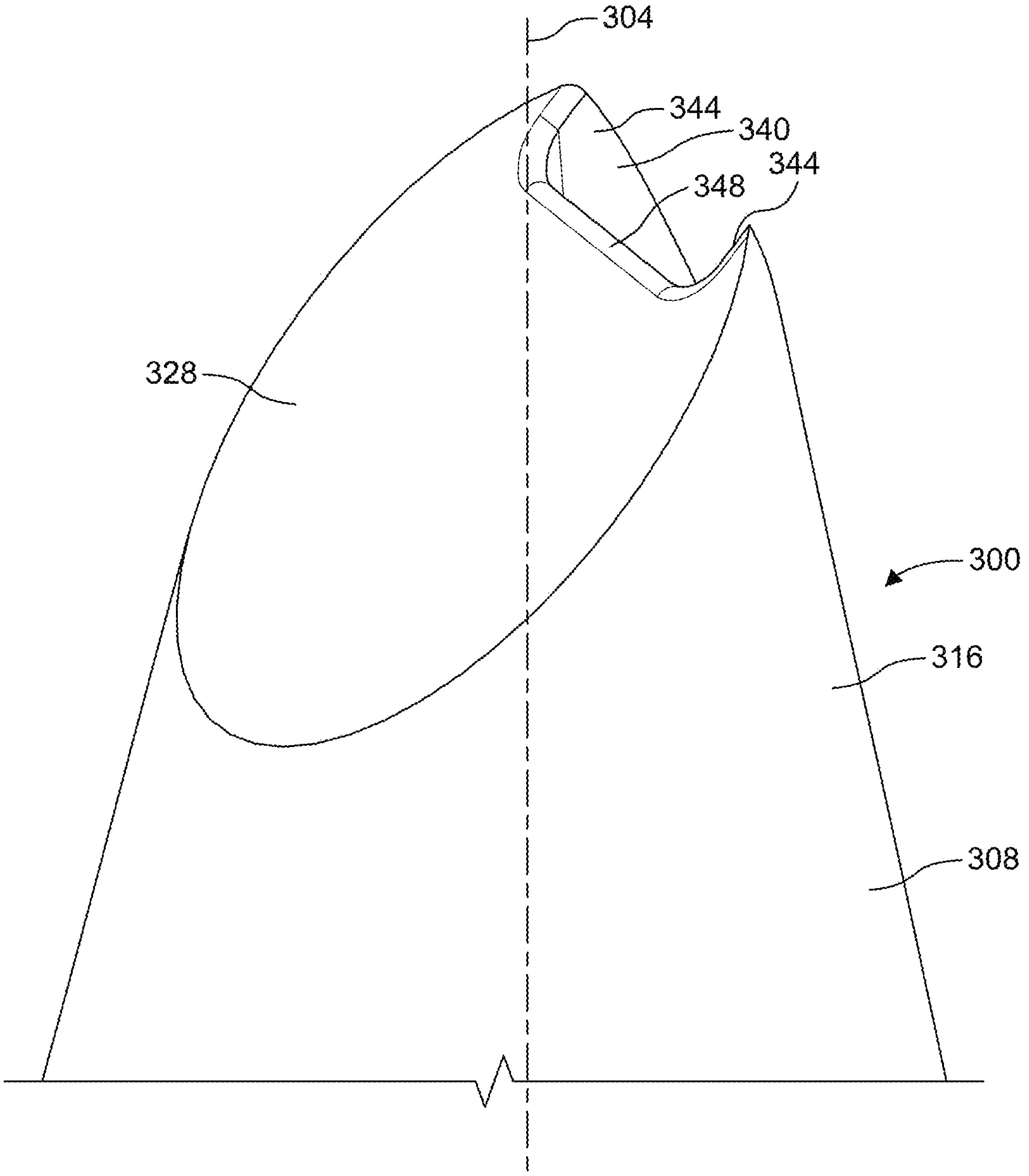
FIG. 11 is an enlarged view of the tip portion of a nozzle for dispensing a V-bead of a viscous material according to a first embodiment of the present invention.
Figure 12:
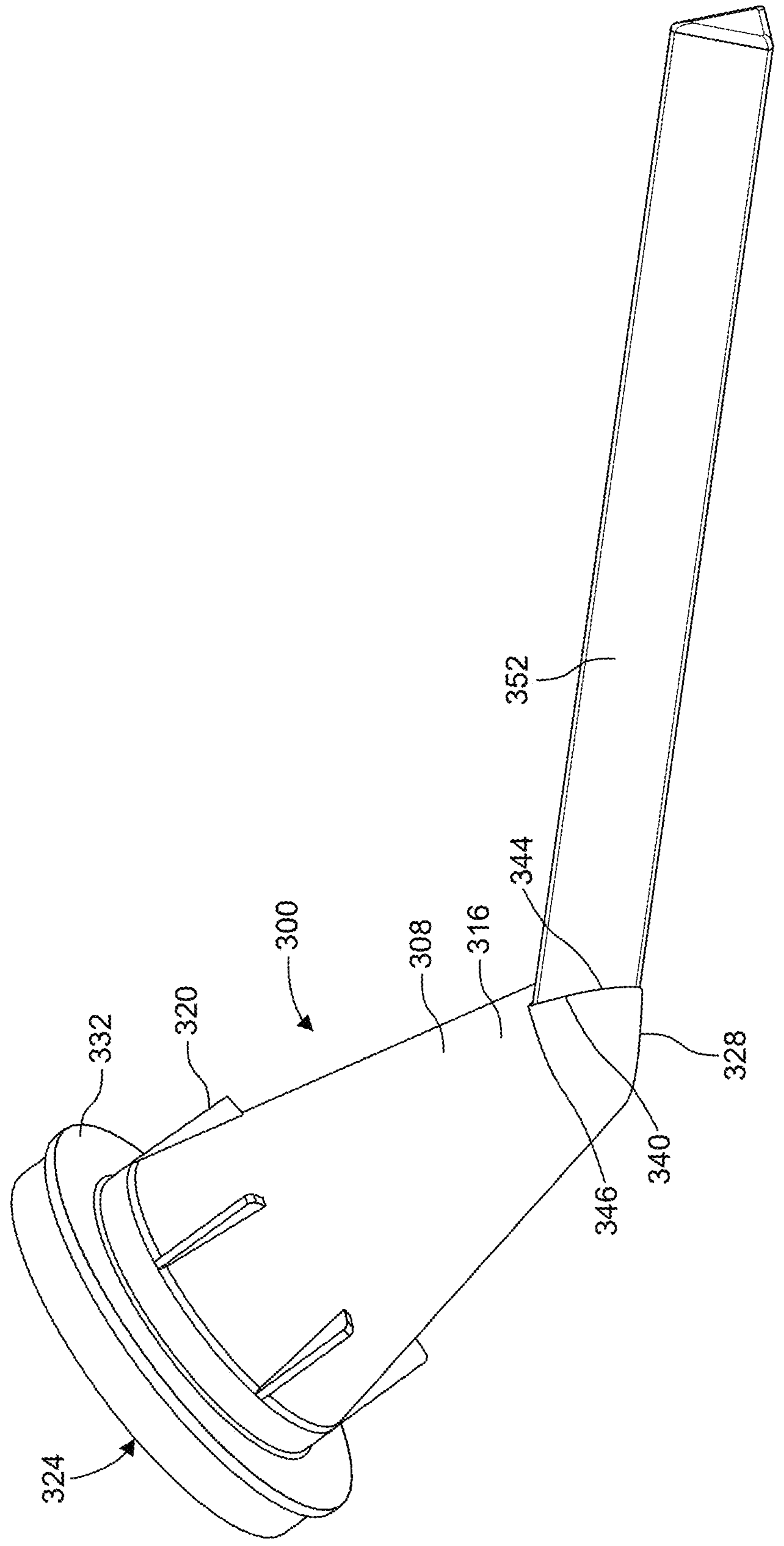
FIG. 12 is a perspective view of the first embodiment nozzle for dispensing a V-bead of viscous material showing the nozzle positioned at an approximately 45-degree angle with respect to the work surface.
Figure 13:
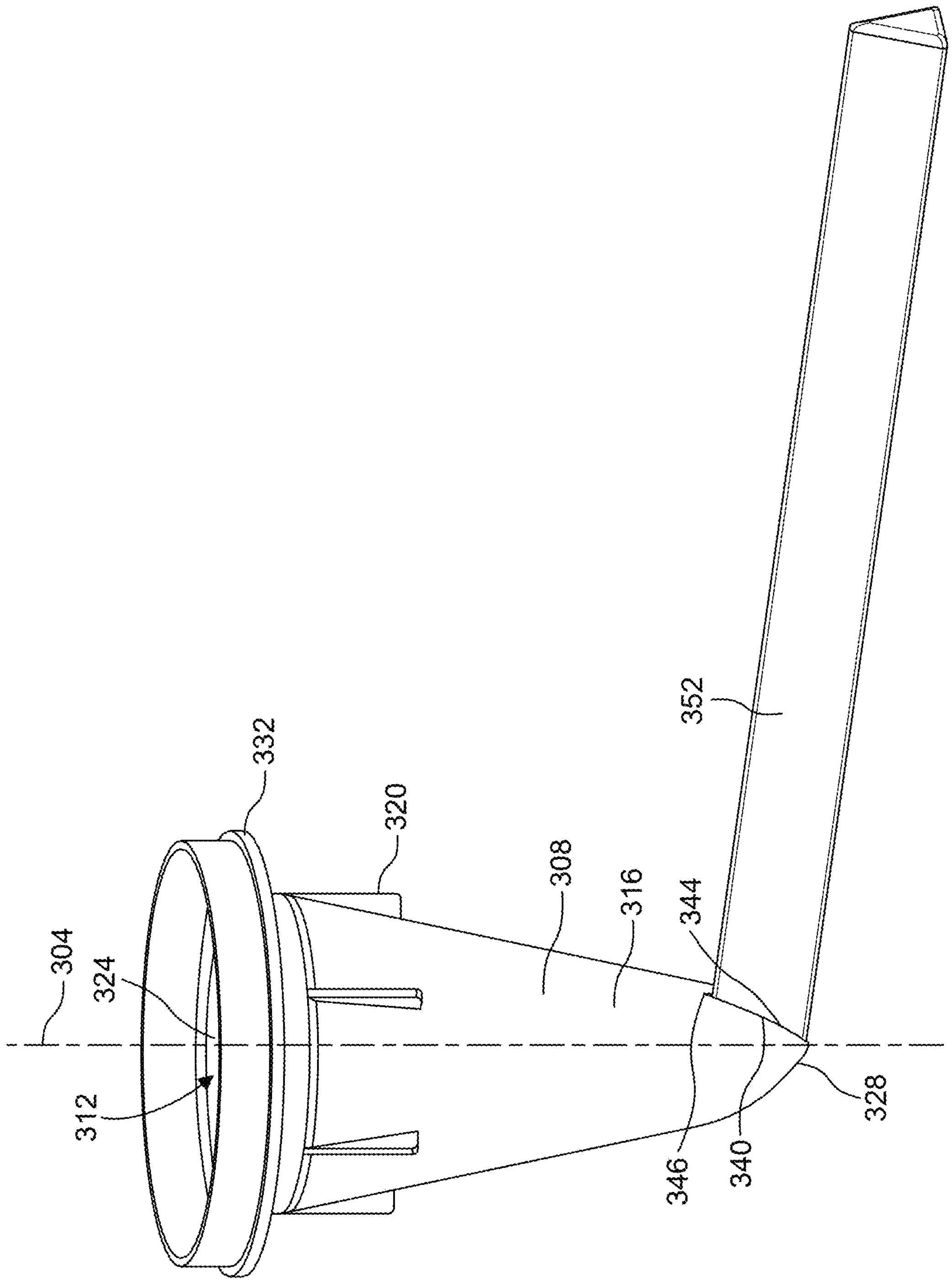
FIG. 13 is a perspective view of the first embodiment nozzle for dispensing a V-bead of viscous material showing the nozzle disposed in an upright position with respect to the work surface; and, FIG. 14 is a perspective view of a prior art nozzle for dispensing a V-bead of viscous material.

Referring now to FIGS. 11-13, the present invention addresses these drawbacks by providing a nozzle 300 having a configuration that eliminates the circular aperture 230 of the prior art nozzle 200 leaving only a V-shaped outlet orifice 340 for dispensing a V-bead 352 to provide the installer with greater flexibility during use. The inventive nozzle 300 includes a cone-shaped sidewall 308 defining an internal cavity 312, a receiving end opening 324, the outlet orifice 340, and a central longitudinal axis 304. The receiving end opening 324 may be wider than the dispensing end opening 328, and the nozzle 300 may be provided with an annular shoulder 332 to enable retention to the dispensing device, as described above. The dispensing nozzle 300 can be arranged for dispensing from cartridges which are usually used for containing adhesives, but also can be arranged for dispensing viscous materials in bulk form, or from a collapsible tube (sausage tube).

As best shown in FIG. 11, the cone-shaped sidewall 308 tapers to a truncated portion which defines a flat wall 328. As shown in the exemplary embodiment, the flat wall 328 is generally oval-shaped but could be other shapes. The flat wall 328 may be inclined at a first angle, e.g., an acute angle, relative to a central longitudinal axis 304. As the flat wall 328 extends from the receiving end opening 324, it widens, then narrows, and then converges with an outlet orifice 340 formed in the cone-shaped sidewall 308. In the exemplary embodiment, the outlet orifice 340 is an inverted V-shaped notch for dispensing a V-bead 352 of viscous material such as adhesive. The outlet orifice 340 may include a bottom wall 348 and end walls 344. The end walls 344 may extend upwardly from the bottom wall 348 to converge at an apex 346 to form a triangle. The bottom wall 348 may coincide with the bottom edge of the flat wall 328.

As best shown in FIG. 13, the outlet orifice 340 may be inclined at an angle, e.g., an acute angle, relative to the central longitudinal axis 304. Under the inventive nozzle 300, the viscous material 352 can only dispense through the outlet orifice 340, as the circular aperture 230 of the prior art nozzle 200 has been eliminated due to the inclusion of the flat wall 328. In this manner, during dispensing, an installer may hold the dispensing device and nozzle 300 attached thereto at the 90-degree position relative to the work surface as best shown in FIG. 13, or at a 45-degree position relative to the work surface, as best shown in FIG. 12, or at a range of angular positions between the 90-degree position and the 45-degree position during dispensing. Regardless of the angular position during dispensing, due to the geometry of the nozzle outlet orifice 340 and elimination of the circular aperture 230, the resulting dispensed V-bead 352 will be consistent in shape along its length to ensure an effective seal and bond of the windshield glass to the automobile at all points.

Figure 15:
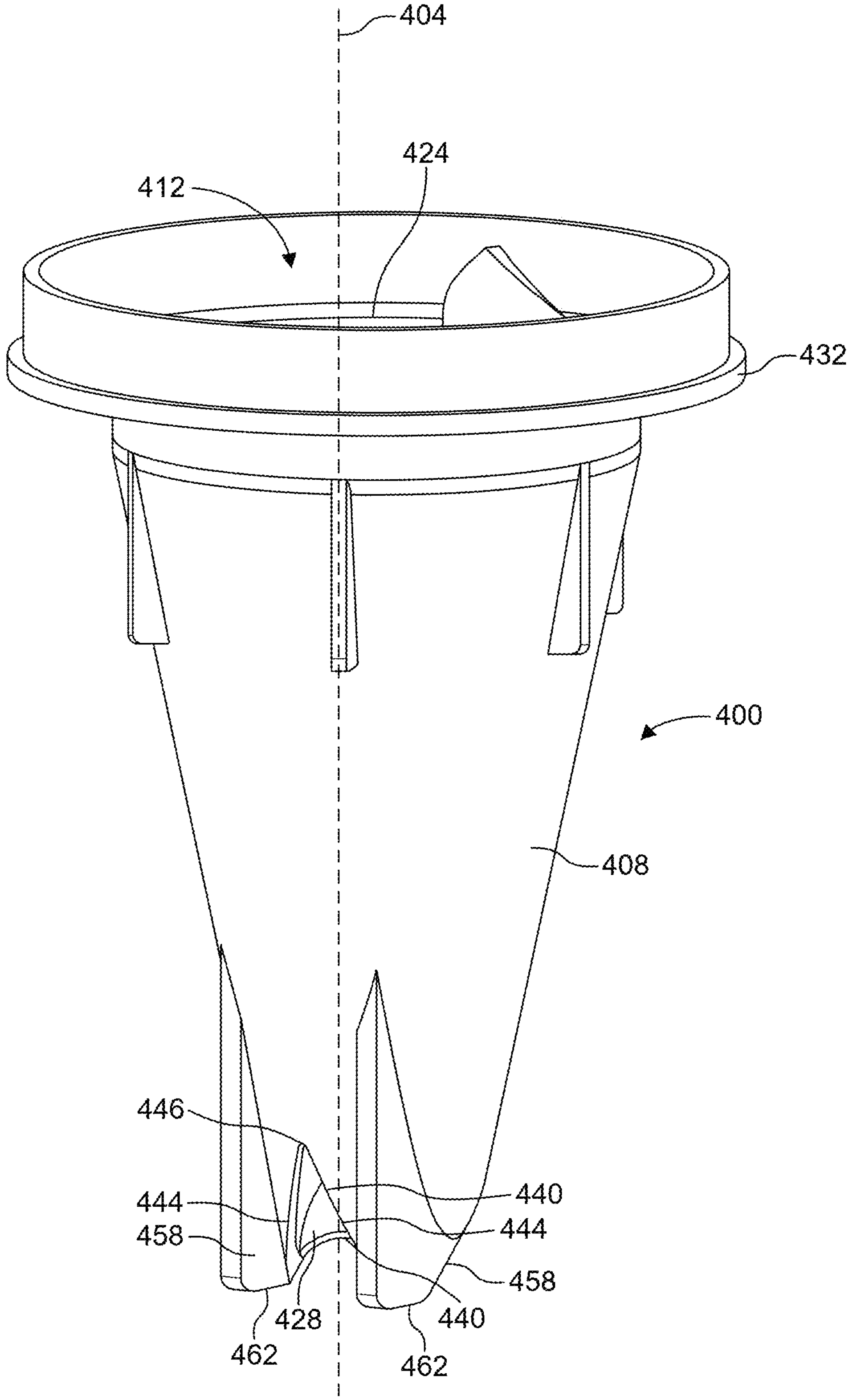
FIG. 15 is a perspective view of a second embodiment nozzle for dispensing a V-bead of a viscous material according to the present invention.
Figure 16:
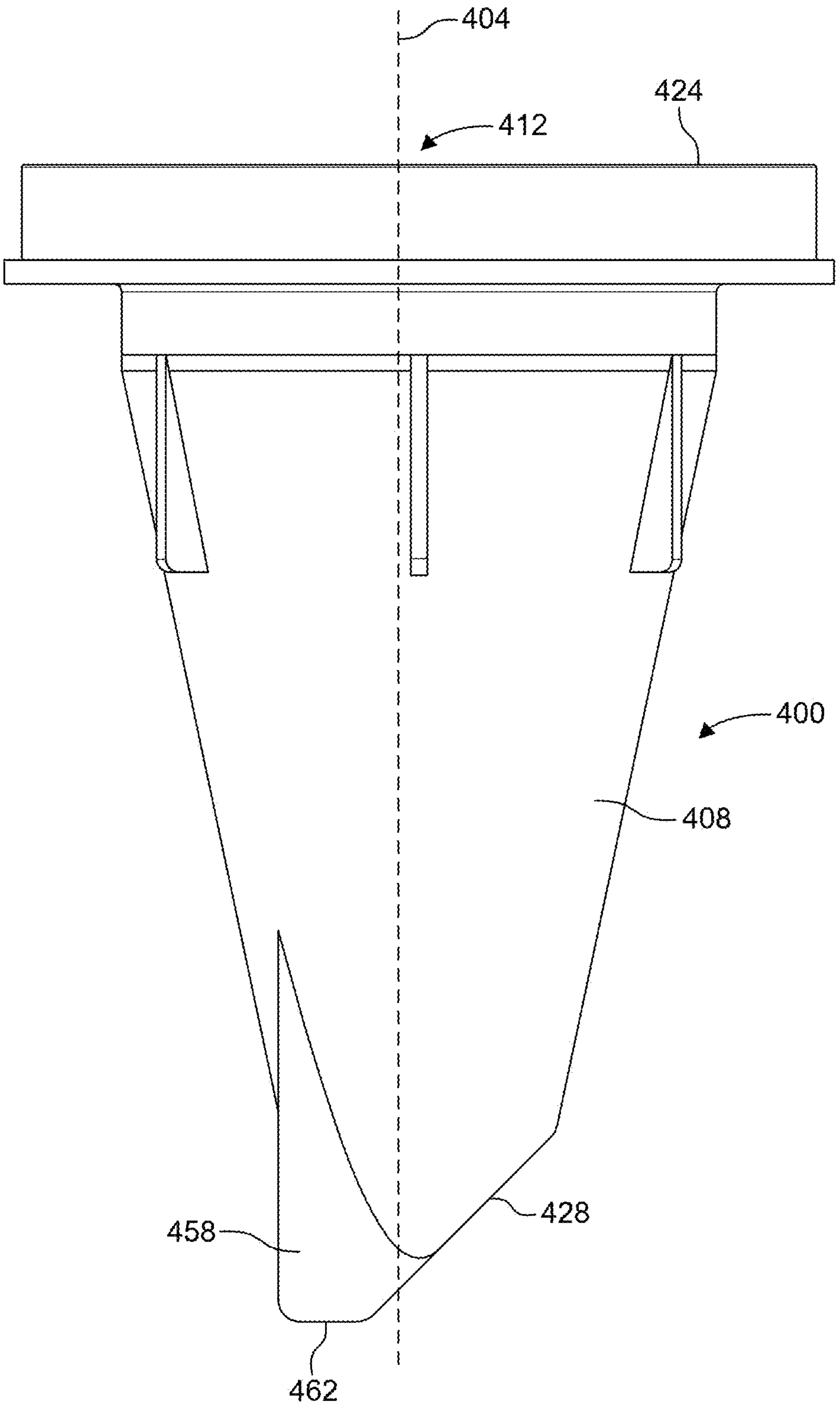
FIG. 16 is an elevational view of the second embodiment nozzle for dispensing a V-bead of viscous material; and, FIG. 17 is a chart illustrating lengths and cross-sections of V-beads produced by the second embodiment inventive nozzle compared with lengths and cross-sections of V-beads produced by the prior art nozzle.

Referring now to FIGS. 15 and 16, there is shown a second embodiment of the inventive nozzle 400 for dispensing a V-bead of viscous material. As with the first embodiment, the nozzle 400 of the second embodiment includes a cone-shaped sidewall 408 that tapers down to a truncated portion which defines a flat wall 428. Also, as with the first embodiment, the flat wall 428 is generally oval-shaped but could be other shapes. As shown in FIG. 16, the flat wall 428 may be inclined at a first angle, e.g., an acute angle, relative to a central longitudinal axis 404. As with the first embodiment, as the flat wall 328 extends from the receiving end opening 424, it widens, then narrows and converges with an outlet orifice 440 formed in the cone-shaped sidewall 408. In the exemplary embodiment, the outlet orifice 340 includes an inverted V-shaped notch for dispensing a V-bead 452 of viscous material such as adhesive. The V-shaped notch may include end walls 444 that extend upwardly to converge at an apex 446.

The inventive nozzle 400 is provided with a pair of opposed stabilizing feet 458 in proximity to the outlet orifice 440 of the nozzle 400. The stabilizing feet 458 are provided to improve stability when dispensing while the nozzle 400 is oriented in the 90-degree position with respect to the work surface. Each of the stabilizing feet 458 is provided with a flat bottom surface 462 increasing the overall area of contact between the nozzle 400 and the work surface when in the 90-degree position. In this manner, the stabilizing feet 458 enable the user to more easily maintain the 90-degree orientation of the nozzle 400 while applying a V-bead, such as to an automobile windshield. The stabilizing feet 458 also provide a degree of added stability when dispensing at a 45-degree position, or in a range of positions between the 90-degree position and the 45-degree position. As shown in FIGS. 15 and 16, the stabilizing feet 458 may be oriented parallel to one another. Alternatively, the stabilizing feet 458 may be oriented in non-parallel positions. The stabilizing feet 458 eliminate the existence of any points at the tip end of the nozzle 400 which could cause tearing if the V-bead 452 is being applied to a soft work surface.

Figure 17:
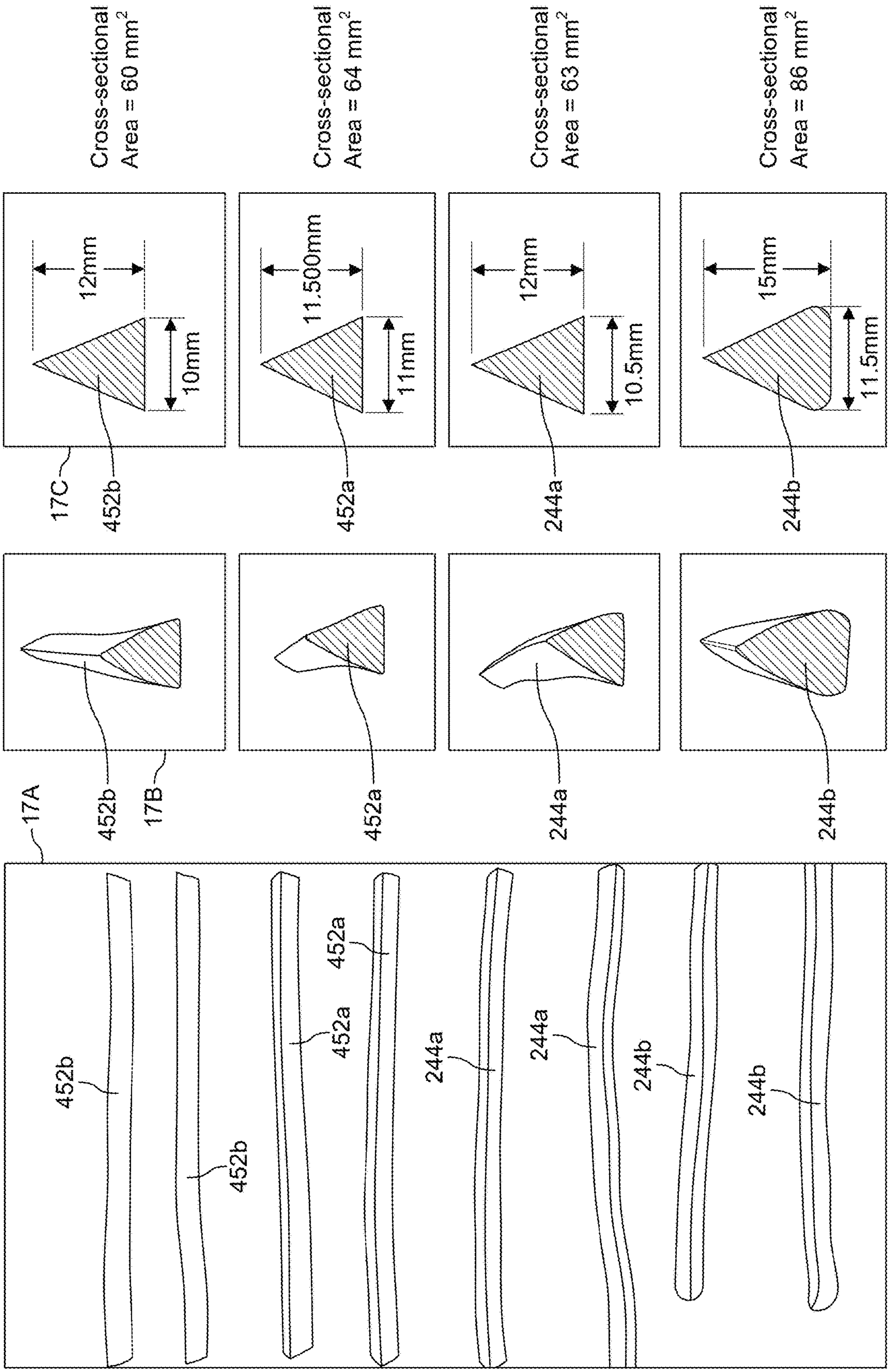

Referring now to FIG. 17, the left-most panel 17A illustrates actual lengths of V-beads 452*a* and 452*b* dispensed from the inventive nozzle 400 at 90 and 45-degree orientations, respectively, and actual lengths of V-beads 244*a* and 244*b* dispensed from the prior art nozzle 200 at 90 and 45-degree orientations, respectively. The center panel 17B illustrates the corresponding cross sections of these V-beads, and the right-most panel shows a calculation of the cross-sectional areas of these V-beads.

The illustrations of the center panel 17B show that the V-bead 452*a* dispensed from the inventive nozzle 400 in the 90-degree position produces a triangular cross-section having an apex centered over the end walls when compared with the V-bead 244*a* dispensed from the prior art nozzle 200 where the apex appears right of center, which in certain applications may be unacceptable. The right-most panel 17C shows that the cross-sectional areas of these beads 452*a* and 244*a*, are approximately equal, i.e., 64 $mm^2$ v. 63 $mm^2$. Thus, the inventive nozzle 400 uses approximately the same amount of viscous material as the prior art nozzle 200 during dispensing, but achieves a more uniform cross-section.

The center panel 17B also shows that the V-bead 452*b* dispensed from the inventive nozzle 400 in the 45-degree position produces a triangular cross-section having sharp base corners, while the V-bead 244*b* dispensed from the prior art nozzle 200 has rounded base corners resulting from its having the circular aperture 230. Such rounded corners are unacceptable in certain applications such as windshield installation. Also, the right-most panel 17C demonstrates the prior art nozzle 200 using substantially more viscous material during dispensing than the inventive nozzle 400, i.e., 86 $mm^2$ cross-sectional area for the V-bead 244*b* v. 63 $mm^2$ cross-sectional area for the V-bead 452*b* dispensed inventive nozzle 400.

While the principles of the invention have been described above in connection with preferred embodiments, it is to be clearly understood that this description is made only by way of example and not as a limitation of the scope of the invention.

The invention claimed is:

1. A nozzle for dispensing a viscous material from a dispensing device, the nozzle comprising:

a. a nozzle body having an inlet end configured to receive the viscous material from the dispensing device, a cone-shaped sidewall, and an outlet orifice for dispensing the viscous material from the nozzle body, the outlet orifice including a bottom wall and end walls that converge to an apex to form a triangle;

b. an elliptically-shaped flat wall formed of a section of the cone-shaped sidewall; and, c. wherein the cone-shaped sidewall and the flat wall converge to form the bottom wall of the outlet orifice.

2. The nozzle of claim 1, additionally comprising a central longitudinal axis, and wherein the flat wall is inclined at a first angle relative to the central longitudinal axis.

3. The nozzle of claim 2, wherein the outlet orifice is inclined at a second angle relative to the central longitudinal axis.

4. The nozzle of claim 3, wherein the first and second angles are acute angles.

5. The nozzle of claim 1, wherein the outlet orifice is shaped to dispense a V-bead of the viscous material onto a substrate.

6. The nozzle of claim 5, wherein the outlet orifice has a generally triangular cross-sectional shape including end walls converging to an apex centered relative to the end walls.

7. The nozzle of claim 1, additionally comprising stabilizing feet located on opposed sides of the outlet orifice.

8. The nozzle of claim 7, wherein each of the stabilizing feet includes a flat bottom surface.

9. The nozzle of claim 8, wherein the stabilizing feet are arranged in a parallel orientation.

10. The nozzle of claim 8, wherein the stabilizing feet are arranged in a non-parallel orientation.

11. The nozzle of claim 7, wherein the stabilizing feet are positioned proximate the outlet orifice to increase contact area with a work surface.

12. The nozzle of claim 1, wherein the outlet orifice is the sole opening through which the viscous material is dispensed.

13. The nozzle of claim 1, wherein the nozzle body further comprises an internal cavity defined by the cone-shaped sidewall and configured to direct the viscous material toward the outlet orifice.

14. The nozzle of claim 1, wherein the inlet end comprises a receiving end opening having a diameter greater than a dispensing end of the nozzle body.

15. The nozzle of claim 1, further comprising an annular shoulder disposed proximate the inlet end and configured to retain the nozzle on the dispensing device.

16. The nozzle of claim 1, wherein the elliptically-shaped flat wall widens and then narrows as it extends from the inlet end toward the outlet orifice.

17. The nozzle of claim 1, wherein the bottom wall of the outlet orifice coincides with a bottom edge of the flat wall.

18. The nozzle of claim 1, wherein the viscous material comprises an adhesive for bonding an automobile glass component to a vehicle.

19. The nozzle of claim 1, wherein the nozzle is configured to dispense the viscous material at multiple angular orientations relative to a work surface.

20. A nozzle for dispensing a viscous material, comprising:

a. a nozzle body having an inlet end, a cone-shaped sidewall defining an internal cavity, and a dispensing end;

b. a flat wall formed from a truncated portion of the cone-shaped sidewall; and c. an outlet orifice formed at the dispensing end and defined by a V-shaped notch including converging end walls forming an apex;

d. wherein the nozzle is configured such that the viscous material is dispensed exclusively through the outlet orifice to form a V-bead having a substantially uniform cross-sectional shape across a range of dispensing angles.

* * * * *